Figure 1:
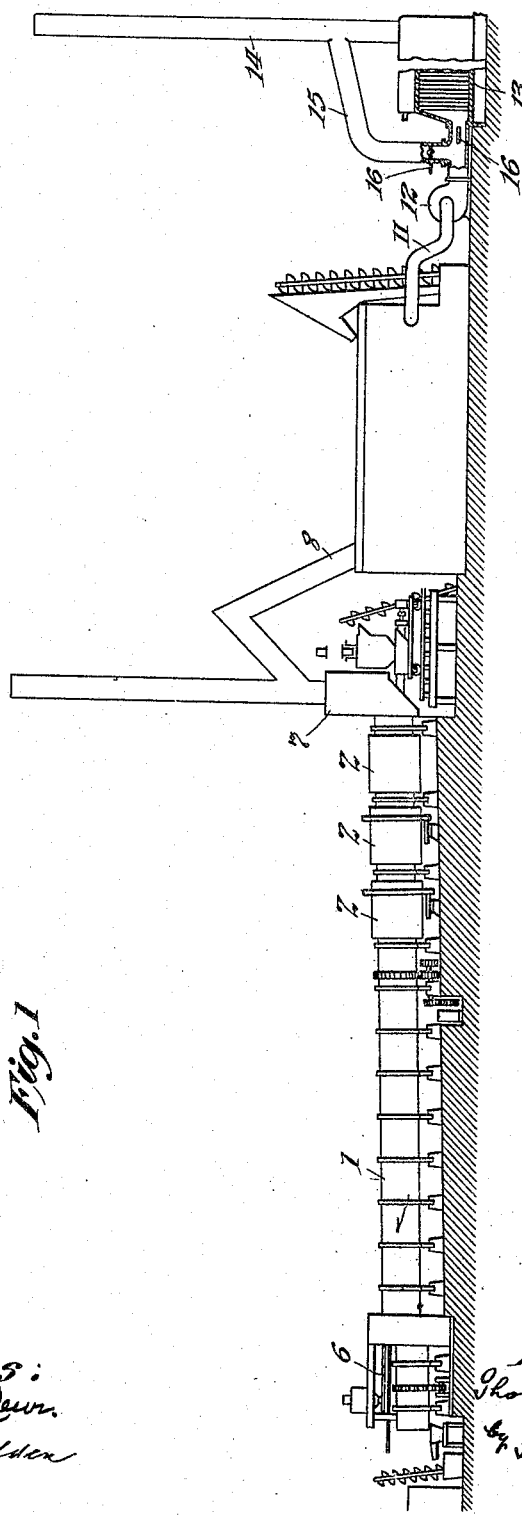

T. A. EDISON.
APPARATUS FOR BURNING PORTLAND CEMENT.
APPLICATION FILED NOV. 26, 1906.

930,949.

Patented Aug. 10, 1909.
2 SHEETS—SHEET 1.

Witnesses:
Frank D. Lewis
Delos Holden

Inventor:
Thomas A. Edison
by Frank L. Dyer
Atty.

T. A. EDISON.
APPARATUS FOR BURNING PORTLAND CEMENT.
APPLICATION FILED NOV. 26, 1906.
930,949.
Patented Aug. 10, 1909.
2 SHEETS—SHEET 2.
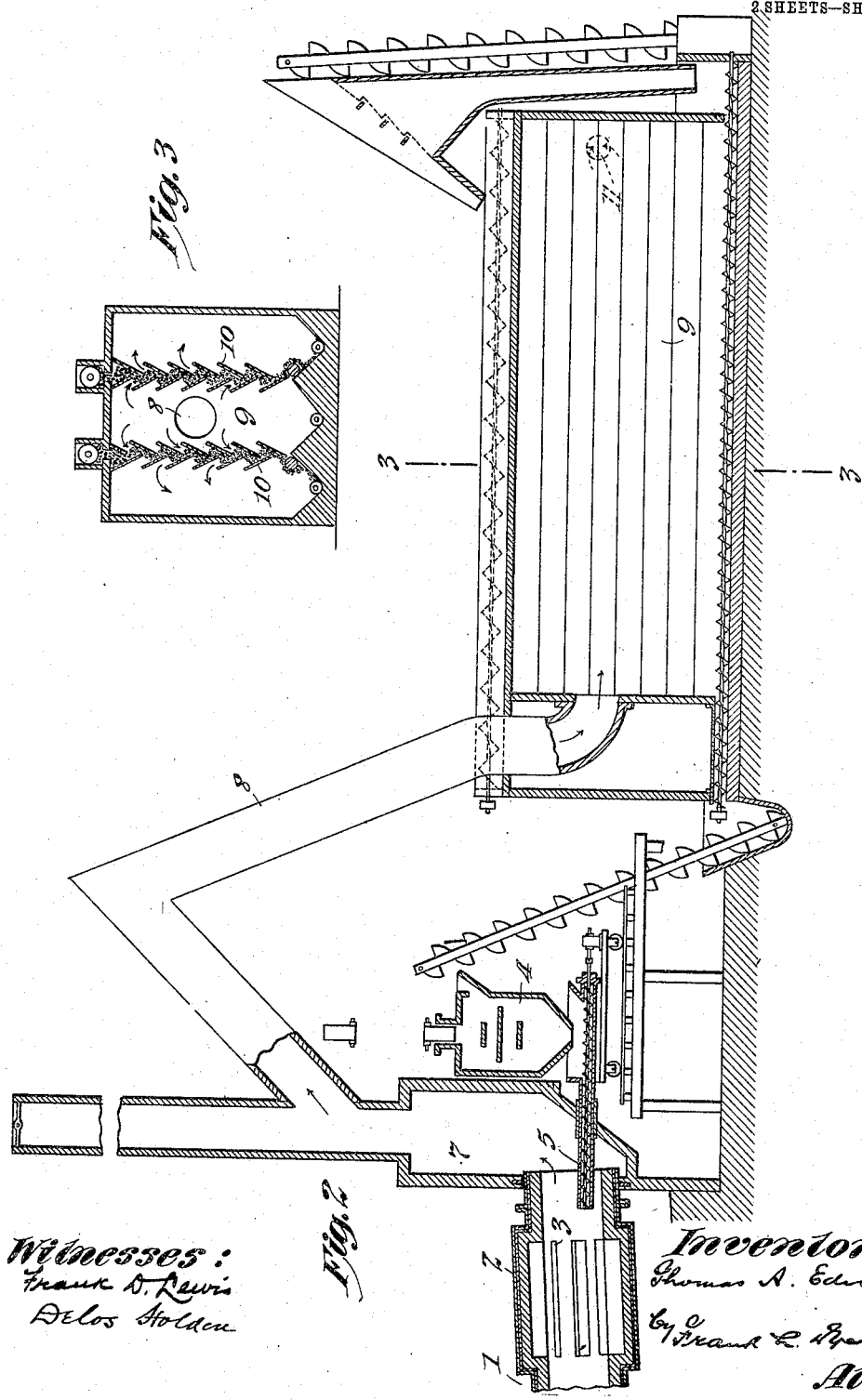

UNITED STATES PATENT OFFICE.

THOMAS A. EDISON, OF LLEWELLYN PARK, ORANGE, NEW JERSEY.

APPARATUS FOR BURNING PORTLAND CEMENT.

No. 930,949.　　　Specification of Letters Patent.　　　Patented Aug. 10, 1909.

Application filed November 26, 1906. Serial No. 345,042.

*To all whom it may concern:*

Be it known that I, THOMAS A. EDISON, a citizen of the United States, residing at Llewellyn Park, Orange, county of Essex, and State of New Jersey, have invented certain new and useful Improvements in Apparatus for Burning Portland Cement, of which the following is a description.

My invention relates to an improved apparatus for burning Portland cement and my object is to provide an apparatus of the rotary type, in which the products of combustion may be utilized effectively to heat an economizer or other industrial apparatus, so as to obtain increased economy.

It has been heretofore proposed to direct the products of combustion from a rotary cement kiln into an economizer or hot stove, but such an expedient has been commercially and practically unsuccessful, owing to the fact that the products of combustion carry with them out of the kiln considerable quantities of the fine dust or chalk.

In an application for Letters Patent, filed October 24th, 1906, Serial No. 340,299, I describe an improved cement burning apparatus in which I utilize in combination with a rotary kiln, a settling chamber and filter of constant porosity, whereby any fine material carried out of the kiln with the draft will be separated therefrom, and this separation takes place even when the proportion of fine material carried with the draft is enormously increased by showering the material diametrically across the kiln, so as to substantially fill the bore thereof with a mass or cloud of the chalk. The use of a filter of this character or of an equivalent type, in combination with a rotary cement kiln, makes it possible to effectively obtain an additional economy by directing the filtered products of combustion through an economizer, hot stove, or other industrial device, in which heat is utilized, since the products of combustion are perfectly clean and carry no solid matter with them.

In order that the invention may be better understood attention is directed to the accompanying drawing, forming part of this specification, and in which—

Figure 1, is a side elevation of a rotary cement kiln, having a filter combined therewith, and illustrating the use of a feed water heater which is adapted to be heated by products of combustion from the filter. Fig. 2, is an enlarged sectional view, showing the upper end of the kiln and filter, and Fig. 3, a cross sectional view through the filter.

In all of the above views, corresponding parts are represented by the same numerals of reference.

The kiln 1, is made preferably of cast iron sections as heretofore, of any suitable length, preferably about 150 feet, and is maintained on rollers so as to be supported in an inclined position. Near its upper end, the kiln is preferably formed with enlarged sections 2, within which are located wings 3, for showering the material diametrically across the kiln, as I describe in said application. The pulverized material is fed into the kiln from a hopper 4, by means of a screw conveyer 5. Material in transit through the kiln is burned by finely pulverized coal or gas, supplied through one or more burners 6. The upper end of the kiln opens into a chamber 7, from which leads a pipe 8, into the central portion 9, of the filter, constituting a settling chamber. This pipe is preferably extended obliquely upward from its base, as shown, so as to permit a settling operation to take place therein, and effect a return of a portion of the solid material to the chamber 7. The side walls of the settling chamber are formed of partitions 10, supplied with coarse granular material, presenting innumerable minute pores, and tortuous channels, and constituting the filtering walls. Suitable mechanism is employed for replenishing the coarse material and for screening the fine chalk collected therein, as I describe in said application. The products of combustion, after passing through the two filter walls, enter pipes 11, leading to a fan 12, the discharge from which connects with an economizer 13, or other industrial device, in which heat may be absorbed. As a convenient illustration, I show a well known form of feed water heater for abstracting heat from the products of combustion. From the economizer or other device, leads a stack 14. The fan 12 is preferably operated by an electric motor controlled by the kiln man at the front of the kiln, whereby the draft will be always under perfect regulation. Extending around the economizer 13 is a by-pass 15, whereby the products of combustion may be forced directly into the stack 14 when desired, suitable dampers 16 being provided to control the path of the products of combustion, as will be understood. In operation, it will be understood that as the fine material progresses through the kiln, it will be showered diametrically across the bore thereof, so as to be brought in direct contact with the flame and products of combustion. In this way, the material may be heated very perfectly and much of the heat now lost will be absorbed by the material. From the kiln the products of combustion, carrying with them a necessarily large proportion of the fine chalk, pass into the settling chamber 7, in which their velocity will be greatly reduced, so that much of the chalk or fine dust will be settled by gravity. From the settling chamber, the gaseous currents seep slowly through the two filter walls, in which any remaining fine material will be separated. After leaving the filter, the products of combustion which are now free from any solid matter, enter the economizer, or other industrial device and give up an additional increment of heat, so that when they pass out of the stack 14, their temperature will be very low. Obviously, the heat thus imparted to the economizer may be used industrially in the plant.

Having now described my invention, what I claim as new and desire to secure by Letters Patent is as follows:

1. In cement burning apparatus, the combination with a rotary kiln, means for burning material in transit through the same, and a settling chamber and a filter connected with the discharge from the kiln and by which any solid material will be separated from the products of combustion therefrom, of a heat absorbing industrial device connected with the filter and to which the products of combustion are finally directed, as and for the purposes set forth.

2. In cement burning apparatus, the combination with a rotary kiln, means for burning material in transit through the same, and a settling chamber and a filter connected with the discharge from the kiln and by which any solid material will be separated from the products of combustion therefrom, of a feed water heater connected with the filter and to which the products of combustion are finally directed, substantially as and for the purposes set forth.

3. In cement burning apparatus, the combination with a rotary kiln, means for burning material in transit through the same, and a settling chamber and a filter connected with the discharge from the kiln and by which any solid material will be separated from the products of combustion therefrom, of a heat absorbing industrial device connected with the filter and to which the products of combustion are finally directed, and a controllable exhaust fan for maintaining the products of combustion in circulation, as and for the purposes set forth.

4. In cement burning apparatus, the combination with a rotary kiln, means for burning material in transit through the same, and a filter connected with the discharge from the kiln for separating from the products of combustion the solid matter carried out of the kiln therewith, of a heat absorbing industrial device to which the products of combustion are directed after leaving the filter a by-pass shunting the heat absorbing device, a stack to which both the device and the by-pass are connected, and a controllable fan for maintaining and regulating the draft through either the said device or the said by-pass, substantially as and for the purposes set forth.

5. In cement burning apparatus, the combination with a rotary kiln, means for burning material in transit through the same, and a filter adjacent to the kiln, and a flue connecting the discharge from the kiln with said filter and presenting an upwardly and downwardly obliquely arranged section for permitting a settling operation to take place, substantially as and for the purposes set forth.

6. In cement burning apparatus, the combination with a rotary kiln, means for burning material in transit through the same, a filter adjacent to the kiln, a flue connecting the discharge from the kiln with the said filter and presenting an obliquely arranged section for permitting a settling operation to take place, a heat absorbing industrial device connected with the filter and to which the products of combustion are finally directed, and a by-pass shunting the heat absorbing device, substantially as set forth.

This specification signed and witnessed this 16th day of November 1906.

THOMAS A. EDISON.

Witnesses:
FRANK L. DYER,
ANNA R. KLEHM.